(12) United States Patent
Morrison

(10) Patent No.: US 12,268,957 B2
(45) Date of Patent: Apr. 8, 2025

(54) DIRECTIONAL PADS WITH DYNAMIC TACTILE FEATURES AND METHODS OF USING THE SAME

(71) Applicant: Dell Products L.P., Round Rock, TX (US)

(72) Inventor: Jason Scott Morrison, Chadron, NE (US)

(73) Assignee: Dell Products L.P., Round Rock, TX (US)

( * ) Notice: Subject to any disclaimer, the term of this patent is extended or adjusted under 35 U.S.C. 154(b) by 358 days.

(21) Appl. No.: 18/150,429

(22) Filed: Jan. 5, 2023

(65) Prior Publication Data
US 2024/0226724 A1 Jul. 11, 2024

(51) Int. Cl.
*A63F 13/24* (2014.01)
*A63F 13/285* (2014.01)
*G06F 3/01* (2006.01)

(52) U.S. Cl.
CPC ............ *A63F 13/285* (2014.09); *A63F 13/24* (2014.09); *G06F 3/016* (2013.01)

(58) Field of Classification Search
CPC ......... A63F 13/24; A63F 13/245; A63F 13/98
See application file for complete search history.

(56) References Cited

U.S. PATENT DOCUMENTS

| | | | | |
|---|---|---|---|---|
| 5,923,317 A | * | 7/1999 | Sayler | A63F 13/285 345/156 |
| 6,359,614 B1 | * | 3/2002 | McVicar | G05G 9/04792 345/157 |
| 9,174,134 B1 | * | 11/2015 | Grant | G06F 3/016 |
| 10,124,249 B2 | * | 11/2018 | Schmitz | A63F 13/00 |
| 10,328,344 B2 | * | 6/2019 | Bellinghausen | A63F 13/285 |
| 2008/0293472 A1 | * | 11/2008 | Strawn | G06F 3/0338 463/16 |
| 2008/0311992 A1 | * | 12/2008 | Young | A63F 13/24 463/37 |
| 2011/0105231 A1 | * | 5/2011 | Ambinder | A63F 13/24 463/38 |
| 2012/0050232 A1 | * | 3/2012 | Ikeda | A63F 13/24 345/184 |
| 2015/0105152 A1 | * | 4/2015 | Bellinghausen | A63F 13/2145 463/31 |
| 2018/0353850 A1 | * | 12/2018 | Strahle | A63F 13/285 |
| 2019/0126143 A1 | * | 5/2019 | Schmitz | A63F 13/22 |
| 2019/0299094 A1 | * | 10/2019 | Bellinghausen | A63F 13/214 |
| 2020/0054942 A1 | * | 2/2020 | Strahle | A63F 13/285 |

(Continued)

*Primary Examiner* — Chase E Leichliter
(74) *Attorney, Agent, or Firm* — Norton Rose Fulbright US LLP

(57) ABSTRACT

A directional pad for a controller can comprise a shell that includes a top having opposing upper and lower surfaces and a plurality of openings that each extend from the upper surface to the lower surface. The directional pad can also comprise a plurality of protrusions that are each movable between a retracted state in which the protrusion is disposed at or below the upper surface of the top of the shell and a deployed state in which the protrusion extends through a respective one of the openings of the top of the shell such that at least a portion of the protrusion is disposed above the upper surface of the top of the shell. A plurality of actuators can each be configured to move a respective one of the protrusions between the retracted and deployed states.

20 Claims, 13 Drawing Sheets

(56) References Cited

U.S. PATENT DOCUMENTS

2022/0274012 A1\*  9/2022  Spiering ................. A63F 13/24
2023/0218987 A1\*  7/2023  Morrison ................ A63F 13/22
                                                            463/37
2024/0226724 A1\*  7/2024  Morrison .............. A63F 13/214

\* cited by examiner

DIRECTIONAL PADS WITH DYNAMIC TACTILE FEATURES AND METHODS OF USING THE SAME

FIELD OF INVENTION

The present invention relates generally to directional pads for use on a controller and, more specifically, to directional pads that employ a touch sensor.

BACKGROUND

Users commonly employ controllers to issue commands that cause actions to occur in a variety of applications, such as in software applications like gaming applications. For example, a controller may be in communication with an information handling system (e.g., a personal computer or a gaming console) that is running a gaming application, and user inputs into the controller may be translated into commands that cause in-game actions like character movement, menu selections, and/or the like.

Handheld controllers may offer better mobility than other user interfaces like a keyboard and mouse, but the constrained form factor of a handheld controller may impose limitations on its performance. For example, handheld controllers may not have as many user-inputs (e.g., buttons, thumbsticks, and/or the like) as other user interfaces like a keyboard and mouse, which may in turn limit the amount of commands that can be readily issued using the handheld controller. To illustrate, handheld controllers often include a directional pad that only allows for four directional inputs (e.g., up, down, left, and right), which limits the extent to which the directional pad can be used to cause movement, scroll through options in a software application, and/or the like. While additional buttons can provide more user inputs, doing so in a handheld controller with a small form factor can result in confusion and lead a user to make incorrect input selections when the controller is used.

Additionally, a controller may be used to issue commands in different applications that involve a different numbers of actions to be controlled. As such, while the entirety of a given user-input on the controller may be employed when using the controller in one application, only a portion of the user-input may be employed when using the controller in a different application in which there are fewer actions to be controlled. This can cause confusion for a user when it is not readily apparent which portion of the user-input is selectable for a given application.

SUMMARY

Some of the present directional pads for use in a controller can better indicate which regions of the directional pad are selectable for a given application. To do so, the directional pad can include a shell having a top with an upper surface that a user interacts with, and a plurality of protrusions that are each movable between a retracted state and a deployed state. When in the retracted state, a protrusion can be disposed at or below the upper surface of the top of the shell. When in the deployed state, the protrusion can extend through a respective one of a plurality of openings of the top of the shell such that at least a portion of the protrusion is disposed above the top's upper surface. A deployed protrusion can provide tactile feedback to a user touching the directional pad to indicate that the region of the upper surface containing the deployed protrusion is selectable to send a command, while a retracted protrusion can indicate that the region of the upper surface containing the retracted protrusion is not selectable. The combination of protrusions in the deployed state and protrusions in the retracted state can be set for a particular application depending on which regions of the directional pad should be selectable to fulfill the application's control requirements. Because the directional pad can be used with different applications whose control requirements may rely on inputs from different regions of the directional pad, each of the protrusions can be moved between the deployed and retracted states as needed to appropriately indicate which regions of the directional pad are selectable for a particular application. In this manner, the directional pad's protrusions can dynamically signal to a user which regions of the directional pad are selectable based on the application the directional pad is being used with.

This signaling can facilitate the use of more user inputs on the directional pad to provide a higher granularity of control than conventional directional pads, such as with a touch pad that can be used to determine a position on which the directional pad is touched. This is because the signaling from the protrusions can mitigate any risk of confusion that may arise from including a relatively large number of possible selectable regions, with the number of active, selectable regions varying based on the application.

A user input device, such as a gaming controller, including one of the present directional pads and as disclosed in embodiments of this disclosure may be used by a user to provide user input to an information handling system. An information handling system generally processes, compiles, stores, and/or communicates information or data for business, personal, or other purposes thereby allowing users to take advantage of the value of the information. A user input device may be coupled to such an information handling system through wires and/or wireless connections, such as a universal serial bus (USB) connection or a Bluetooth, Wi-Fi, or other local area or personal area network connection. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such a gaming application, financial transaction processing, airline reservations, enterprise data storage, or global communications. In one example embodiment, an information handling system may execute a gaming application for processing user inputs from the gaming controller to generate an audio/visual (AV) stream for presentation to the user that includes a world generated based on the user input. In addition, information handling systems may include a variety of hardware and software components that may be configured to process, store, and communicate information and may include one or more computers systems, data storage systems, and networking systems.

Some of the present directional pads for a controller comprise a shell and a plurality of protrusions. Some of the present controllers comprise a body and a directional pad coupled to the body, the directional pad comprising a shell and a plurality of protrusions. In some embodiments, the shell of the directional pad includes a top that has opposing upper and lower surfaces and a plurality of openings that each extend from the upper surface to the lower surface. Each of the protrusions of the directional pad, in some embodiments, is movable between a retracted state in which the protrusion is disposed at or below the upper surface of the top of the shell and a deployed state in which the protrusion extends through a respective one of the openings of the top of the shell such that at least a portion of the protrusion is disposed above the upper surface of the top of the shell. In some embodiments, the openings comprise eight or more openings. In some embodiments, the protrusions comprise eight or more protrusions.

In some embodiments, the directional pad comprises a haptic body that includes the projections. The haptic body, in some embodiments, includes a central region that has opposing upper and lower surfaces, wherein the upper surface of the central region is coupled to the lower surface of the top of the shell. In some embodiments, the haptic body includes a plurality of fingers that each extend outwardly from the central region and having opposing upper and lower surfaces. The upper surface of each of the fingers, in some embodiments, faces the lower surface of the top of the shell. Each of the fingers, in some embodiments, is pivotable relative to the central region between first and second positions. In some embodiments, each of the protrusions of the haptic body project upwardly from the upper surface of a respective one of the fingers such that the protrusion is in the retracted state when the finger is in the first position and is in the deployed state when the finger is in the second position. Each of the fingers, in some embodiments, is integral with the central region of the haptic body.

In some embodiments, the directional pad comprises a plurality of actuators. The actuators, in some embodiments, comprise eight or more actuators. Each of the actuators, in some embodiments, is configured to move a respective one of the protrusions between the retracted and deployed states. Each of the actuators, in some embodiments, comprises a linear actuator having a shaft. The shaft of each of the linear actuators, in some embodiments, is coupled to a respective one of the fingers of the haptic body. In some embodiments, the shaft of each of the linear actuators is linearly movable between first and second states such that the finger coupled to the shaft is in the first position when the shaft is in the first state and is in the second position when the shaft is in the second state. In some embodiments, the shaft of each of the linear actuators is coupled to the lower surface of a respective one of the fingers of the haptic body. The linear actuator, in some embodiments, comprises a latching solenoid.

In some embodiments, the directional pad comprises a capacitive touch sensor coupled to the haptic body such that the haptic body is disposed between the capacitive touch sensor and the top of the shell. The capacitive touch sensor, in some embodiments, is configured to measure a position at which an electrically-conductive object touches the upper surface of the top of the shell.

The upper surface of the top of the shell, in some embodiments, has a circular planform. In some embodiments, each of the openings of the top of the shell is disposed closer to the periphery of the top than to a center of the top.

Some controllers comprise a plurality of buttons coupled to the body. The body, in some controllers, has a main portion disposed between first and second gripping portions. Each of the gripping portions, in some controllers, projects rearwardly away from the main portion. In some controllers, the directional pad is disposed closer to the first gripping portion than to the second gripping portion. The directional pad, in some controllers, is disposed closer to a front of the body than to a rearmost point of the first gripping portion. The buttons, in some controllers, include four buttons that are each disposed closer to the second gripping portion than to the first gripping portion and closer to the front of the body than to a rearmost point of the second gripping portion. Some controllers comprise two thumbsticks. Each of the thumbsticks, in some controllers, is coupled to the main portion of the body. In some controllers, each of the thumbsticks is disposed closer to a rear of the main portion of the body than to the front of the body.

Some of the present methods comprise sending a signal to a controller that includes a directional pad coupled to a body of the controller. The directional pad, in some methods, comprises a shell that includes a top that has opposing upper and lower surfaces and a plurality of openings that each extend from the upper surface to the lower surface. In some methods, the directional pad comprises a plurality of protrusions that are each movable between a retracted state in which the protrusion is disposed at or below the upper surface of the top of the shell and a deployed state in which the protrusion extends through a respective one of the openings of the top of the shell such that at least a portion of the protrusion is disposed above the upper surface of the top of the shell. Some methods comprise, in response to the signal, moving at least a first one of the protrusions from the retracted state to the deployed state. In some methods, when the first protrusion is moved to the deployed state, at least a second one of the protrusions is in the retracted state.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the terms "about" and "approximately" may be substituted with "within [a percentage] of" what is specified, where the percentage includes 0.1, 1, 5, and 10 percent.

The terms "comprise" and any form thereof such as "comprises" and "comprising." "have" and any form thereof such as "has" and "having." and "include" and any form thereof such as "includes" and "including" are open-ended linking verbs. As a result, a product or system that "comprises," "has," or "includes" one or more elements possesses those one or more elements but is not limited to possessing only those elements. Likewise, a method that "comprises," "has." or "includes" one or more steps possesses those one or more steps but is not limited to possessing only those one or more steps.

Any embodiment of any of the products, systems, and methods can consist of or consist essentially of—rather than comprise/have/include—any of the described steps, elements, and/or features. Thus, in any of the claims, the term "consisting of" or "consisting essentially of" can be substituted for any of the open-ended linking verbs recited above in order to change the scope of a given claim from what it would otherwise be using the open-ended linking verb.

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

In FIG. 1A, each of the protrusions is in a retracted state in which the protrusion is disposed at or below an upper surface of the top of the shell.

DETAILED DESCRIPTION

Figure 1A:
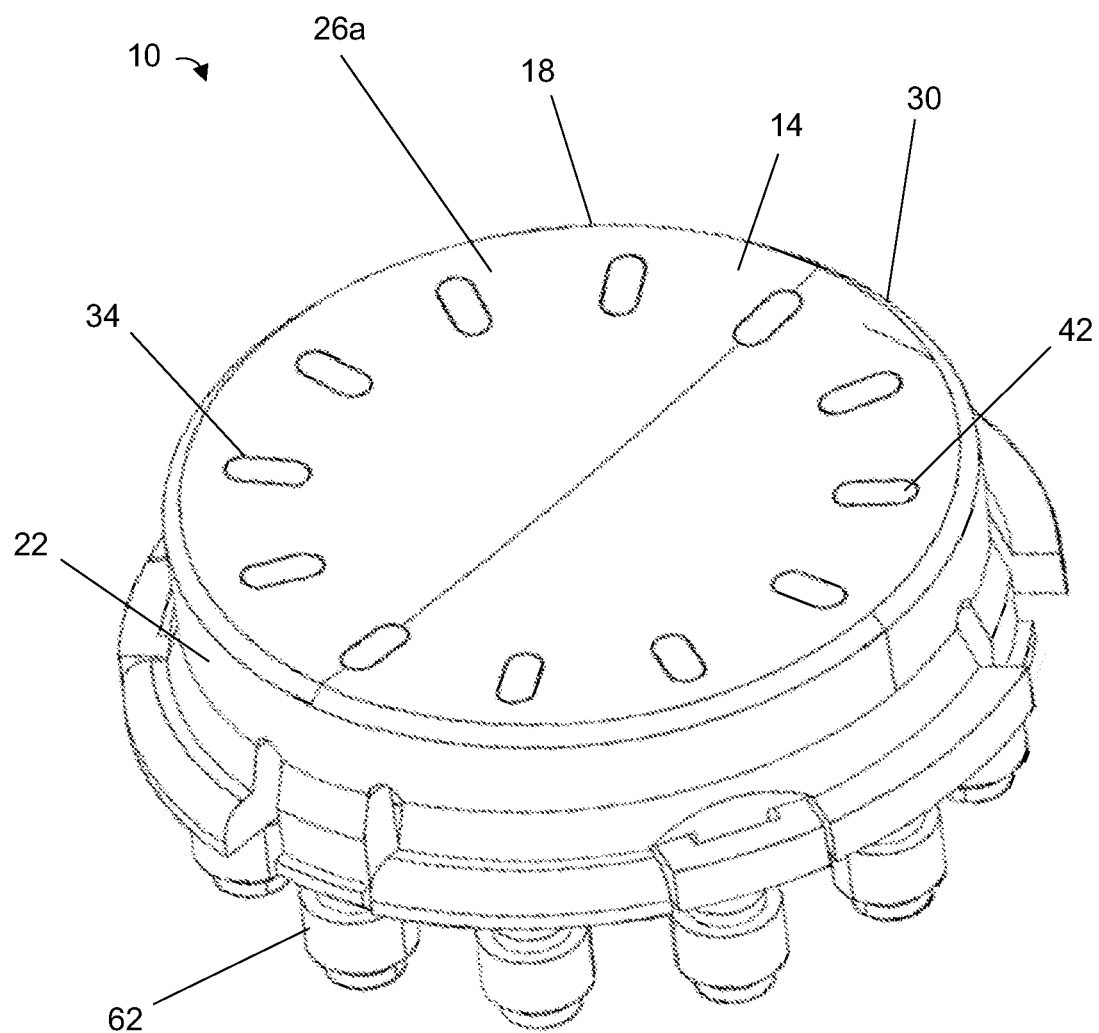
FIG. 1A is a perspective view of one of the present directional pads that includes a shell having a plurality of openings and a haptic body with a plurality of protrusions.
Figure 1B:
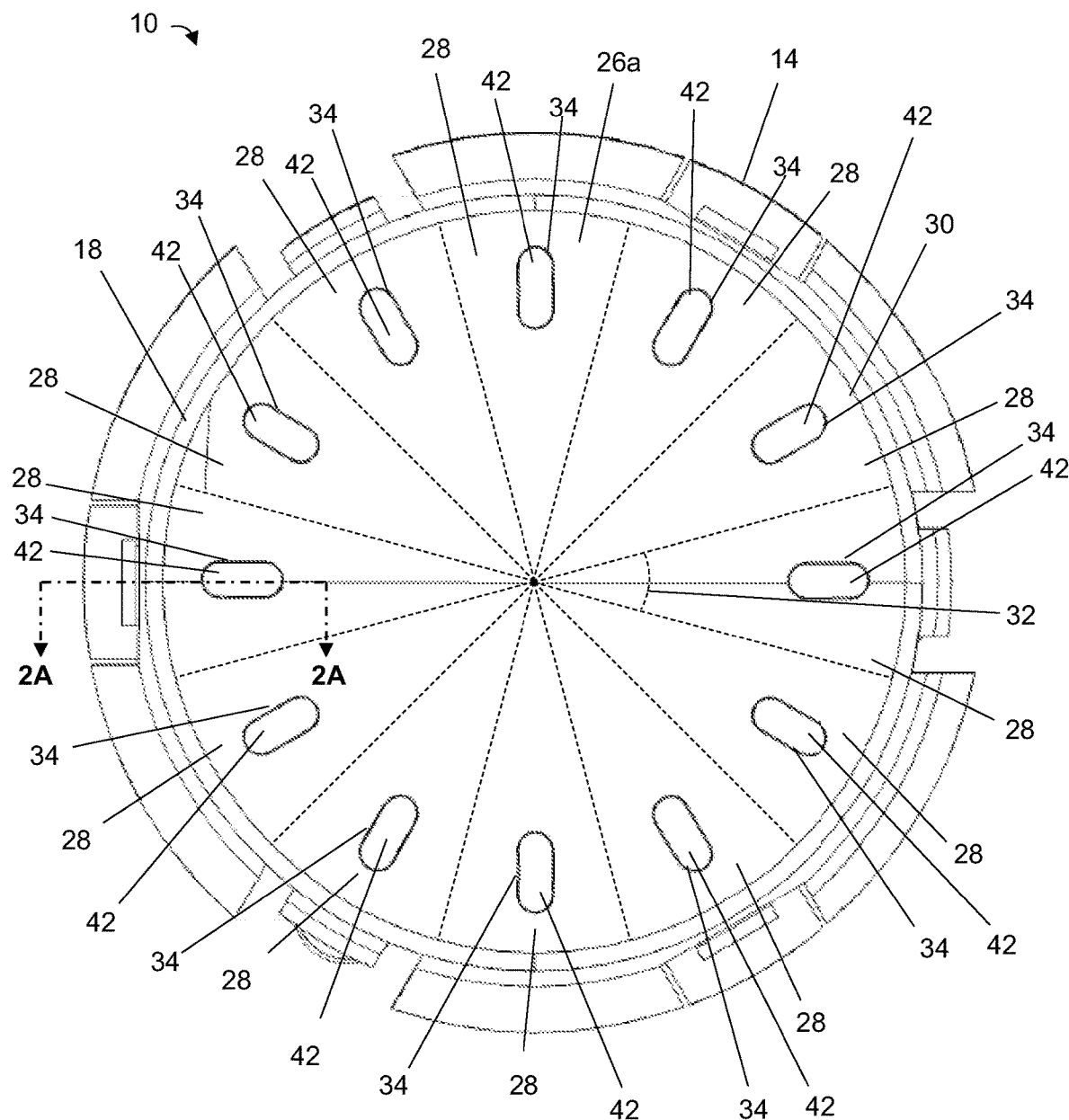
FIG. 1B is a top view of the directional pad of FIG. 1A.
Figure 1C:
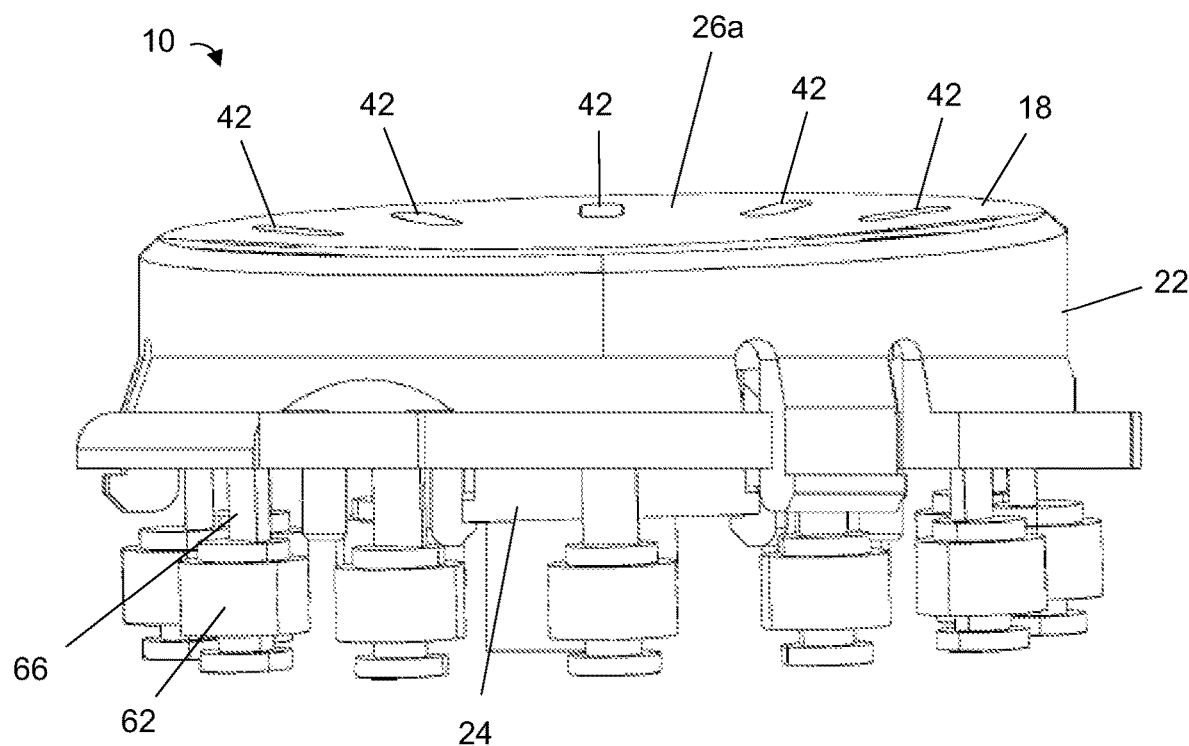
FIGS. 1C-1F are rear, right, front, and left views, respectively, of the directional pad of FIG. 1A.
Figure 1D:
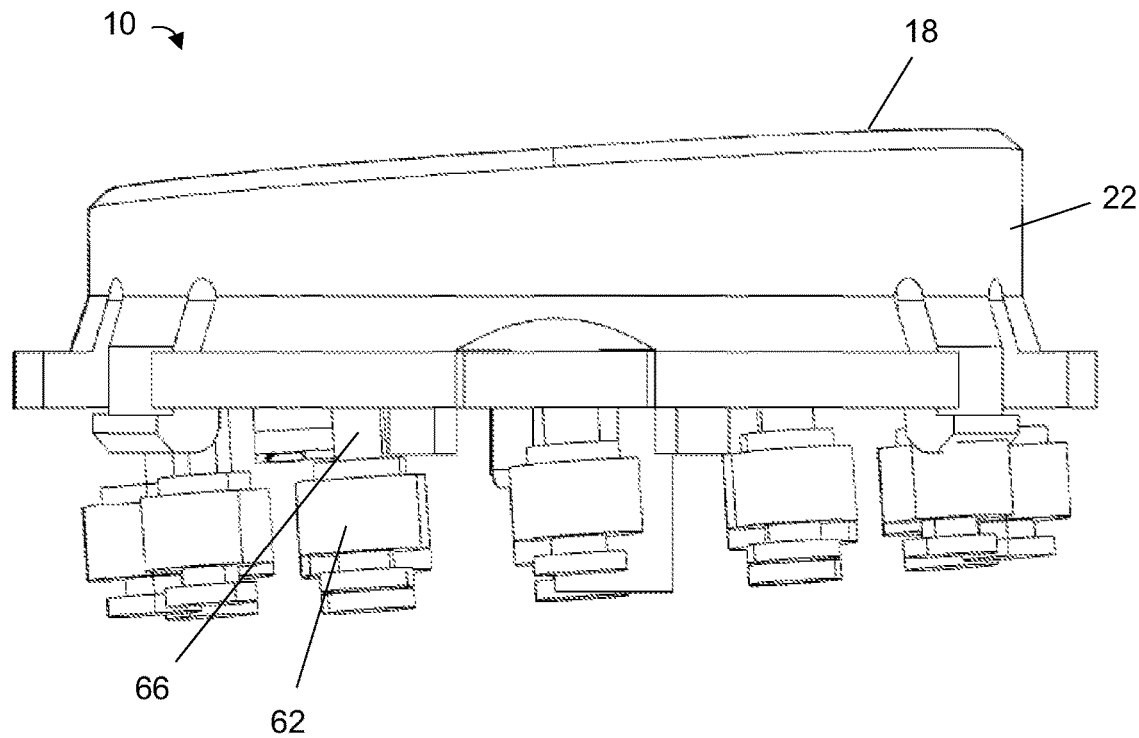
Figure 1E:
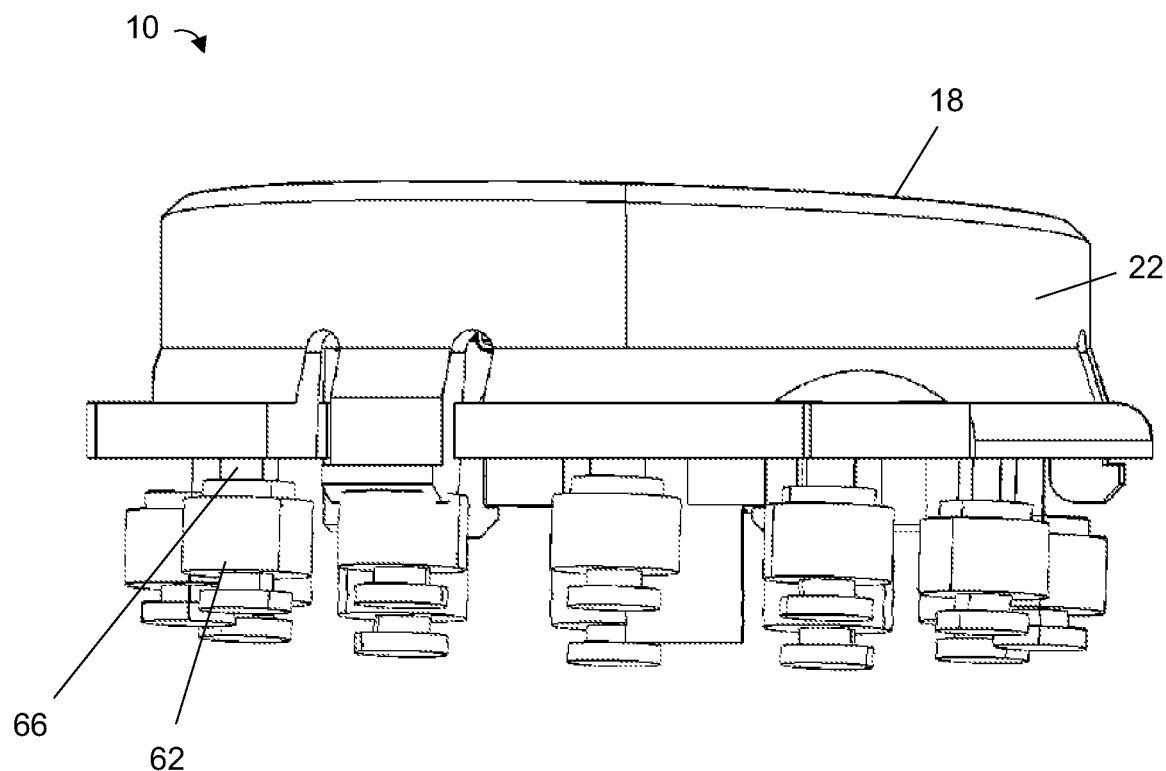
Figure 1F:
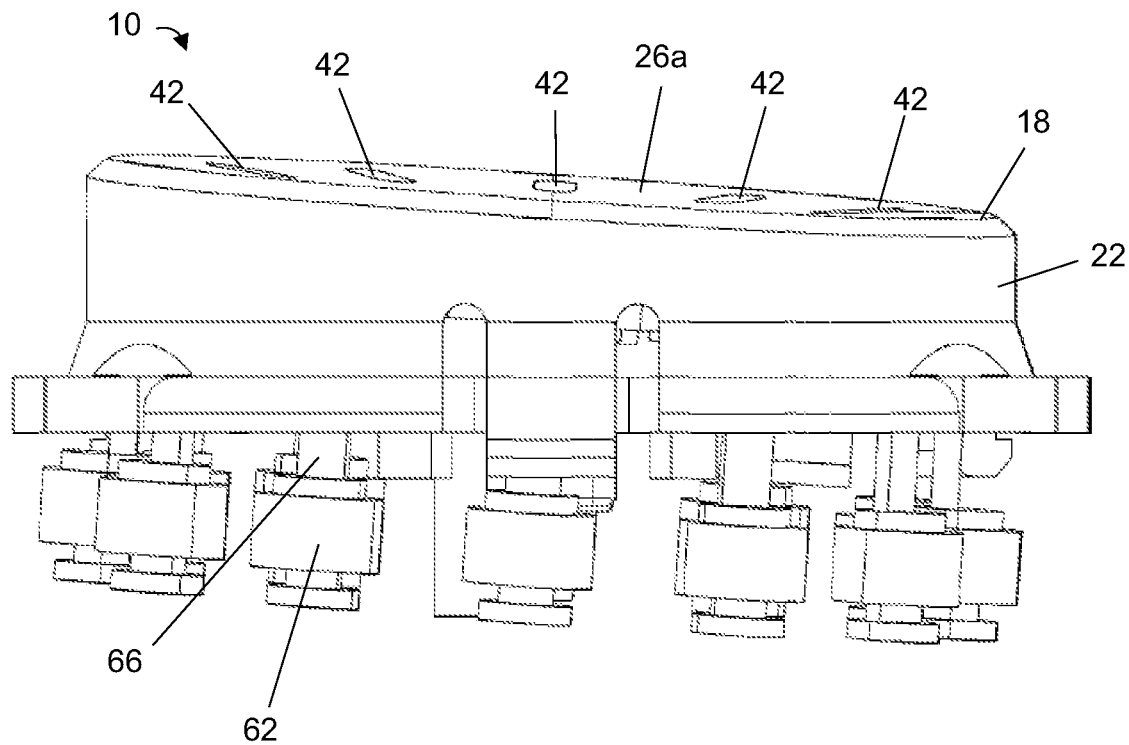
Figure 1G:
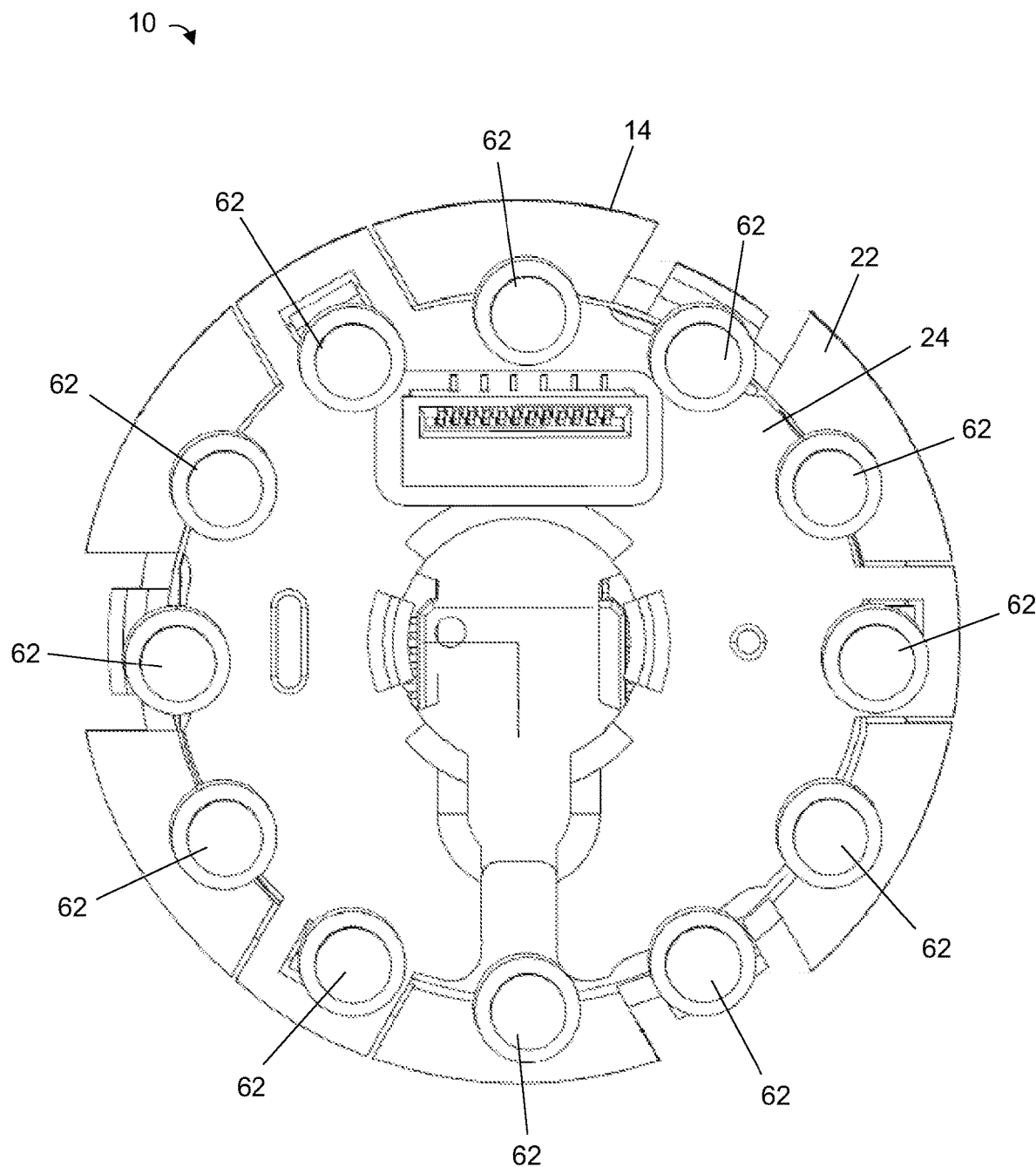
FIG. 1G is a bottom view of the directional pad of FIG. 1A.
Figure 1H:
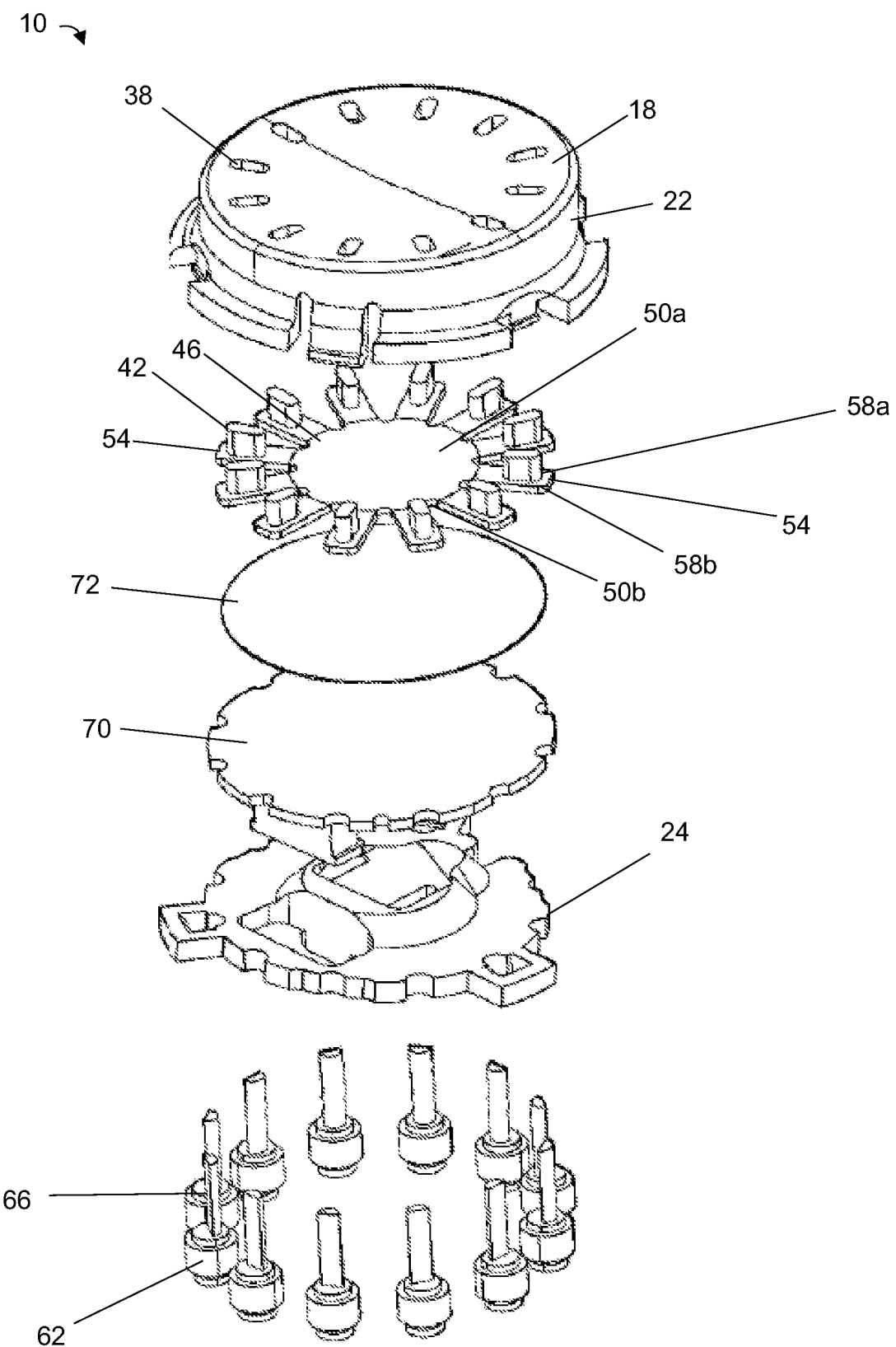
FIG. 1H is an exploded view of the directional pad of FIG. 1A.

Referring to FIGS. 1A-1H, shown is an embodiment 10 of the present directional pads that has an upper surface 26a. Directional pad 10 can comprise a shell 14 having a top 18. Top 18 can define upper surface 26a and an opposing lower surface 26b, and a sidewall 22 can be disposed along at least a majority (up to and including substantially all) of a periphery 30 and project downwardly away from the lower surface of the top. Shell 14 can also include a bottom 24 coupled to sidewall 22 such that the bottom, sidewall, and top 18 define an interior space that can house other components of directional pad 10; in other embodiments, however, the shell need not include a sidewall (e.g., with at least a portion of a controller body that the directional pad is coupled to defining a space with the top that houses other components of the directional pad).

Upper surface 26a of directional pad 10 can serve as the interface that a user interacts with to make user inputs with the directional pad. Directional pad 10 can include, for example, a touch sensor 70 (e.g., on a printed circuit board) that is configured to measure a position—such as an angular and/or radial position—at which an electrically-conductive object—such as the user's finger—touches upper surface 26a of directional pad 10. For example, for an angular position, directional pad 10's upper surface 26a can have a plurality of sectors 28, such as greater than or equal to any one of, or between any two of, four, five, six, seven, eight, nine, ten, eleven, or twelve (e.g., greater than or equal to eight, such as twelve) sectors, disposed about a center of the upper surface, and touch sensor 70 can be configured to measure which of the sectors is touched with the electrically-conductive object. Each of sectors 28 can, but need not, subtend substantially the same angle 32, and can collectively subtend approximately 360°; as shown, there are twelve sectors that each subtend approximately 30°. Touch sensor 70 can also be used to determine a radial position of the touch (e.g., where, along a direction along a radius from a center of directional pad 10's upper surface 26a, the electrically-conductive object touches the upper surface).

Touch sensor 70 can be a capacitive touch sensor having a plurality of electrodes to perform this touch-location determination. When a voltage is applied to an electrode of touch sensor 70, an electrostatic field can be generated; the electrostatic field can be distorted at a point where an electrically-conductive object like the user's finger touches upper surface 26a, thereby creating a change in a capacitance of the touch sensor at a location underlying that point. The change in capacitance be monitored (e.g., by a processor) to determine the touch location.

As one example, touch sensor 70 can be a self-capacitance touch sensor in which a voltage can be applied to each of the electrodes and a self-capacitance of the electrode (e.g., the capacitance between the electrode and a ground) can be monitored (e.g., by measuring a current through the electrode); when the electrically-conductive object touches a portion of upper surface 26a that overlies the electrode, the self-capacitance of the electrode can increase such that the touch sensor conveys a signal (e.g., a correspondingly higher current) indicating that the electrically-conductive object is touching the portion of the upper surface overlying the electrode. The electrodes can follow different paths to allow touch sensor 70 to measure when different portions (e.g., different sectors 28) of upper surface 26a are touched. For example, the electrodes can be arranged in a grid with a first set of the electrodes extending in a widthwise direction at different positions along a lengthwise direction that is perpendicular to the widthwise direction, and a second set of electrodes can extend along the lengthwise direction at different positions along the widthwise direction. A change in capacitance in one of the electrodes of the first set and one of the electrodes of the second set can those indicate a position in the lengthwise direction and on the widthwise direction, respectively, where a touch occurs. To permit touch sensor 70 to be used to determine an angular position of the touch, at least a portion of each of sectors 28 of directional pad 10's upper surface 26a can overly one or more of the electrodes (e.g., at least a portion of at least one of the electrodes of the first set and at least a portion of at least one of the electrodes of the second set) such that, when the portion of the sector is touched with the electrically-conductive object, the self-capacitance of at least one of the electrode(s) changes to indicate that the sector is touched.

As another example, touch sensor 70 can be a mutual-capacitance touch sensor in which the electrodes include a first set of electrodes overlapping a second set of electrodes to define a plurality of junctions where the electrodes cross over one another (e.g., in the above-described grid pattern). A voltage can be applied to each of the electrodes of the first set and, at each of the junctions, a capacitance between the electrode of the first set and the electrode of the second set at the junction can be monitored (e.g., by measuring a voltage on the electrode of the second set); when the electrically-conductive object touches a portion of upper surface 26a that overlies the junction, the capacitance can decrease such that the touch sensor conveys a signal (e.g., a changed voltage on the electrode of the second set) indicating that the electrically-conductive object is touching the portion of the upper surface overlying the junction. To permit touch sensor 70 to be used to determine an angular position of the touch, at least a portion of each of sectors 28 of upper surface 26a can overlie at least one of the junctions such that, when the portion of the sector is touched with the electrically-conductive object, the capacitance between the electrode of the first set and the electrode of the second set that are at the junction changes to indicate that the sector is touched. In each of sectors 28, there can be a plurality of junctions, at least two of which have different radial positions to permit touch sensor 70 to be used to determine a radial position of the touch as well.

The above-described configurations of touch sensor 70 are illustrative and are not limiting; any suitable touch sensor configuration can be used to allow the touch sensor to be used to determine where an electrically-conductive object touches directional pad 10's upper surface 26a. For example, in some embodiments, touch sensor 70 can be a resistive touch sensor instead of a capacitive touch sensor. And, in other embodiments, directional pad 10 can employ a different mechanism to determine where on the directional pad the user is making inputs, such as with a plurality of piezoelectric sensors that can each measure when a respective portion (e.g., sector 28) of the directional pad is pressed.

Inputs made with directional pad 10 (e.g., when the directional pad is part of a controller 74) can be used for control in different software applications like gaming applications, graphics design software, office applications, and/or the like. Directional pad 10 can be used for control in other applications as well, such as to control one or more aspects of a vehicle, a robot, and/or the like. The action prompted in an application may depend at least in part on which of sectors 28 the user interacts with (e.g., touches) to make the input. Different applications may have a different number actions to be controlled by directional pad 10 and thus may rely on different sets of sectors 28 to control those actions. For example, some applications may only rely on inputs into four of sectors 28, such as inputs into the sectors at 12, 3, 6, and 9 o'clock to control upward, rightward, downward, and leftward, respectively, movement and/or scrolling in the application, while other applications may rely on inputs into more sectors (e.g., at least eight sectors) to also allow diagonal movement and/or scrolling in the application.

Figure 2A:
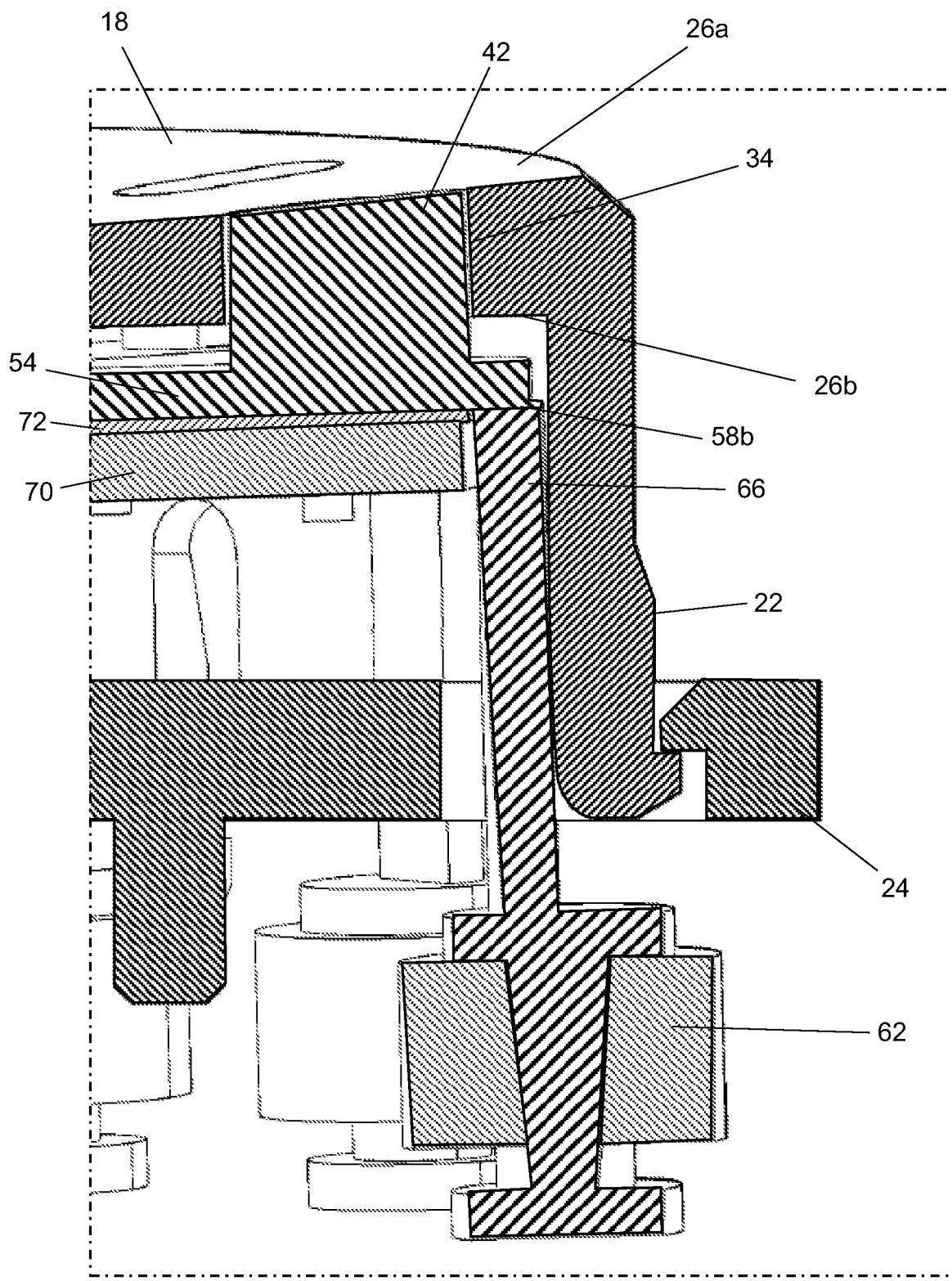
FIG. 2A is a partial sectional view of the directional pad of FIG. 1A taken along line 2A-2A of FIG. 1B and illustrates one of the protrusions of the haptic body in the retracted state.
Figure 2B:
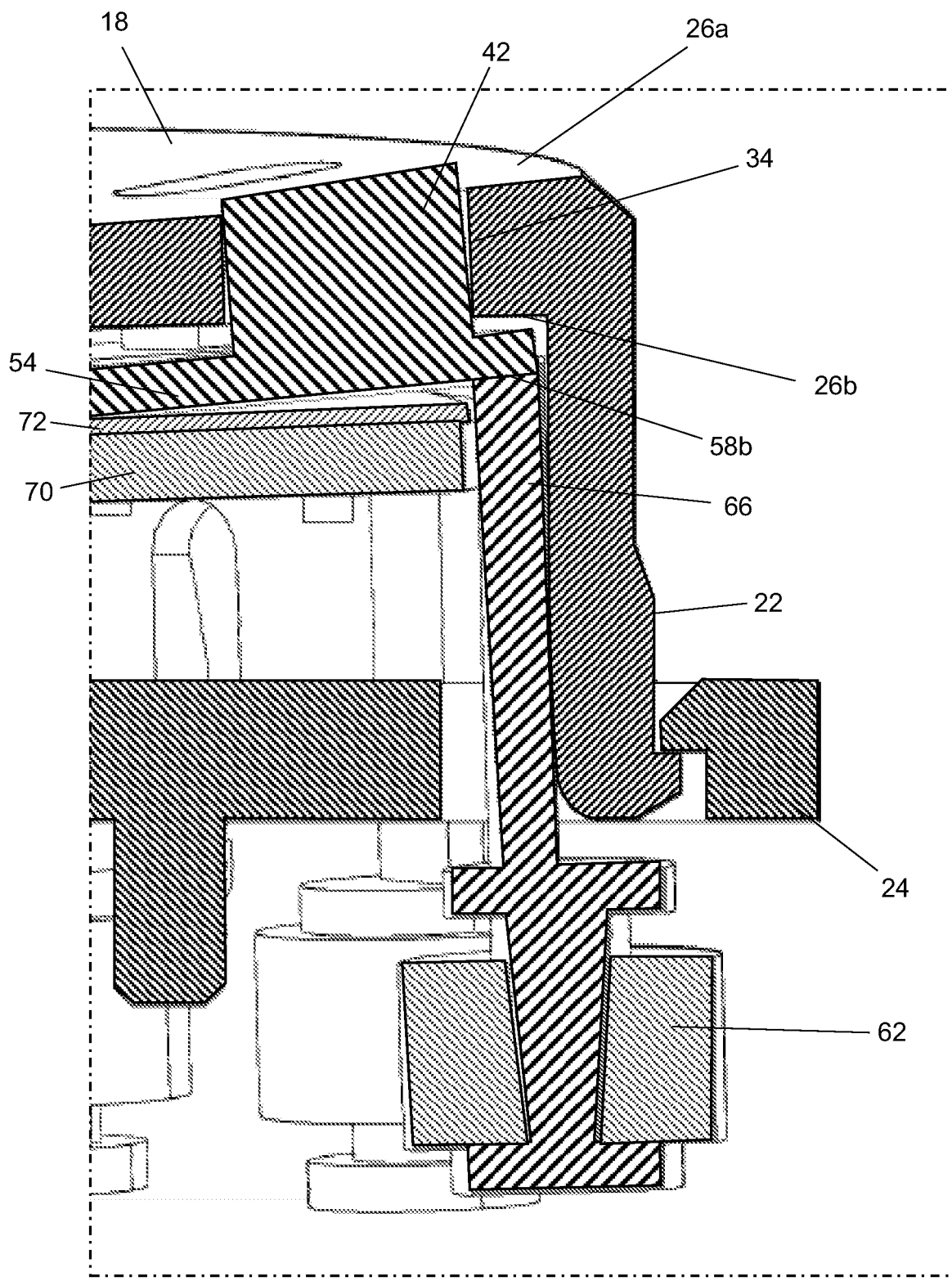
FIG. 2B is a sectional view of the directional pad of FIG. 1A and illustrates one of the protrusions of the haptic body in a deployed state in which the protrusion extends through the opening such that at least a portion of the protrusion extends above an upper surface of the top of the shell.

Referring additionally to FIGS. 2A-2D, to reflect which regions (e.g., which sectors 28) of directional pad 10's upper surface 26a are selectable for a particular application, the directional pad can comprise a plurality of protrusions 42, such as greater than or equal to any one of, or between any two of, four, five, six, seven, eight, nine, ten, eleven, or twelve (e.g., greater than or equal to eight, such as twelve or one for each sector 28) protrusions, that are each movable between a retracted state (FIG. 2A) and a deployed state (FIG. 2B). Shell 14's top 18 can include a plurality of openings 34, such as greater than or equal to any one of, or between any two of, four, five, six, seven, eight, nine, ten, eleven, or twelve (e.g., greater than or equal to eight, such as twelve or one for each protrusion 42) that each extend from its upper surface 26a to its lower surface 26b, and each of the protrusions can extend through a respective one of the openings such that at least a portion of the protrusion is disposed above the upper surface when the protrusion is in the deployed state. Each of protrusions 42, when deployed, can readily indicate to a user, through tactile feedback, that the region of upper surface 26a the protrusion is disposed in is selectable for control. For example, as shown, each of sectors 28 can include at least one of openings 34 such that at least one of protrusions 42—when in the deployed state—can extend past upper surface 26a in the sector; the deployed protrusion(s) that extend past the upper surface in the sector can thus indicate that the sector is selectable. To indicate that a region (e.g., a sector 28) of upper surface 26a is not selectable, each protrusion 42 of that region (e.g., sector) can be moved to the retracted state such that the protrusion is disposed at (e.g., flush with) or below the upper surface of the directional pad such that the protrusion does not provide the tactile feedback it did when in the deployed position; as shown, each of the protrusions, when in the retracted state, is disposed in a respective one of openings 34 and is flush with the top's upper surface.

Protrusions 42 can be coupled to shell 14 in any suitable manner to allow them to move between the deployed and retracted states. As shown, for example, directional pad 10 can comprise a haptic body 38 that includes protrusions 42. Haptic body 38 can include a central portion 46 having opposing upper and lower surfaces 50a and 50b and a plurality of fingers 54, such as greater than or equal to any one of, or between any two of, four, five, six, seven, eight, nine, ten, eleven, or twelve (e.g., greater than or equal to eight, such as twelve or one for each protrusion 42), that each extend outwardly from the central region (e.g., to underlie a respective one of openings 34) and have opposing upper and lower surfaces 58a and 58b. Upper surface 50a of central portion 46 can be coupled to lower surface 26b of shell 14's top 18 (e.g., with an adhesive), and each of protrusions 42 can project upwardly from (and can optionally be integral with) upper surface 58a of a respective one of fingers 54 (which can face the lower surface of the shell's top). Each of fingers 54 can be pivotable relative to central portion 54 between a first position (FIG. 2A) in which a protrusion 42 projecting upwardly from the finger's upper surface 58a is in the retracted state and a second position (FIG. 2B) in which the protrusion is in the deployed state. For example, fingers 54 can be integral with central portion 46 and haptic body 38 can comprise an elastic material such as a polymer to permit each of the fingers to pivot between the first and second positions; with such a construction, the elasticity of the material may bias each finger to the first position (e.g., in which the finger's upper surface 58a, which can be planar, is substantially parallel with the central portion's upper surface 50a that can also be planar) and thus can bias each protrusion 42 to the retracted state to facilitate the protrusion's retractability. In other embodiments, however, fingers 54 need not be integral with haptic body 38's central portion 46; for example, a hinge can couple each of the fingers to the central portion.

While touch sensor 70, as shown, can underlie protrusions 42—such as with touch sensor 70 coupled to haptic body 38

(e.g., with adhesive 72) such that the haptic body is disposed between the touch sensor and top 18 of shell 14—the touch sensor can still register inputs made onto directional pad 10's upper surface 26a. For example, when touch sensor 70 comprises a capacitive touch sensor, protrusions 42 (and haptic body 38) can be sufficiently thin and comprise a material (e.g., a polymer) to allow an electrically-conductive object touching upper surface 26a to affect an electrostatic field generated in the touch sensor and thus a capacitance thereof such that the touch sensor can detect the touch.

Figure 2C:
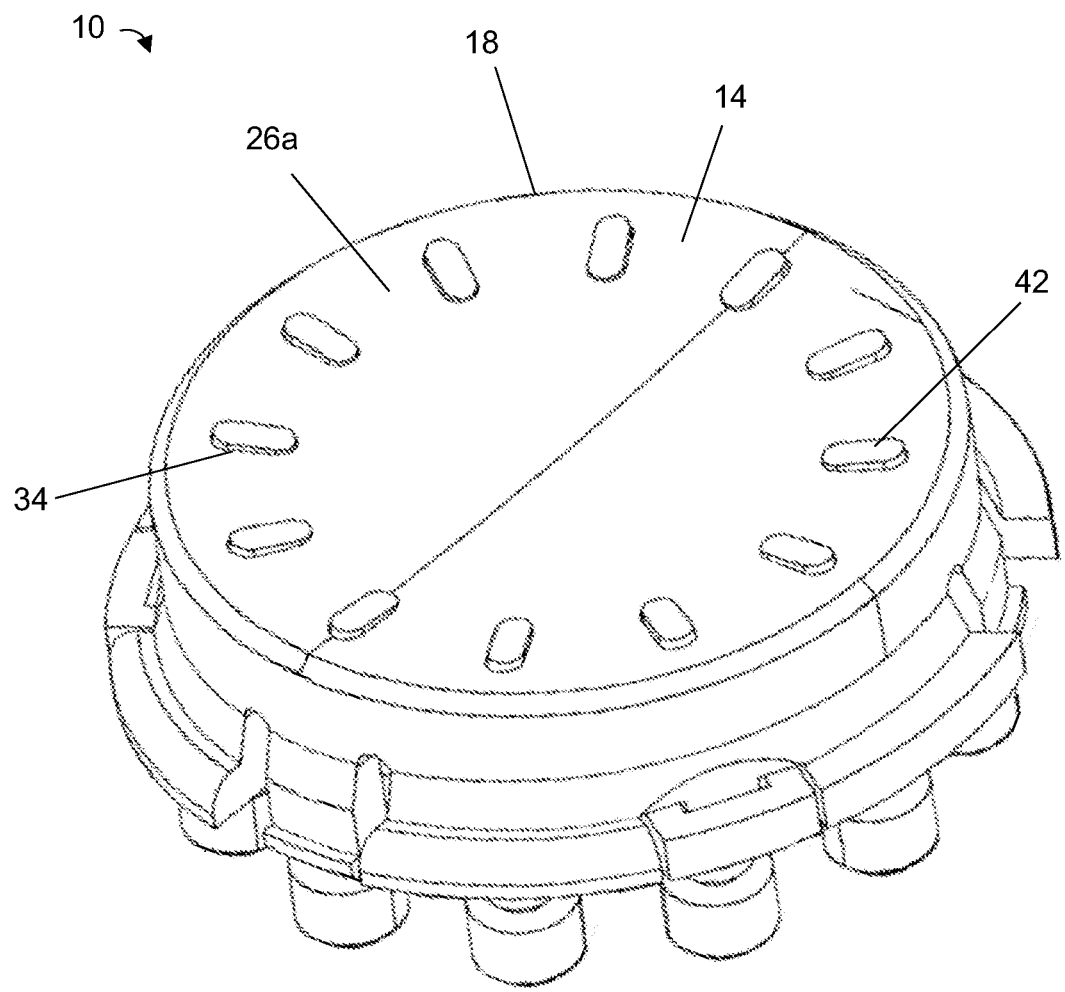
FIG. 2C is a perspective view of the directional pad of FIG. 1A in which all of the protrusions are in the deployed state.
Figure 2D:
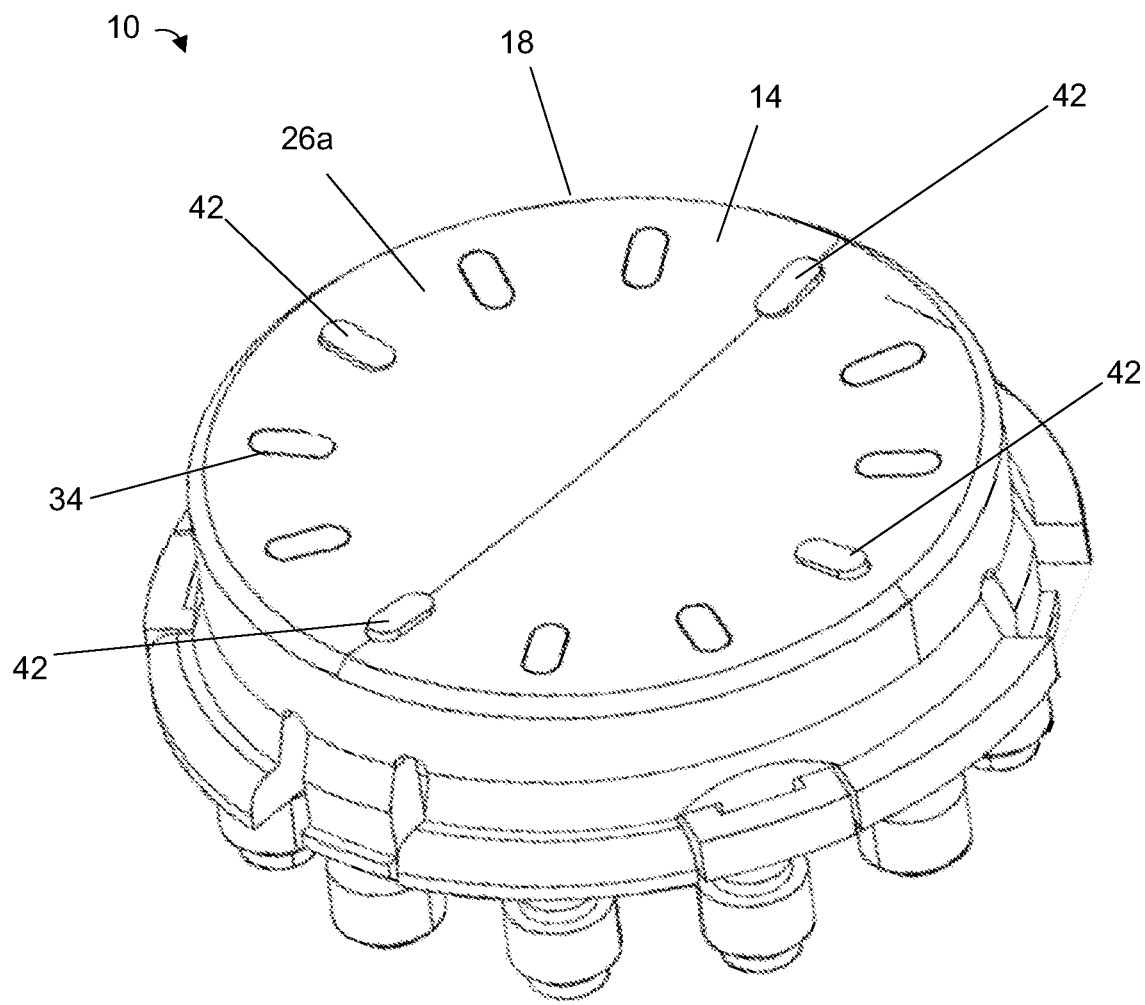
FIG. 2D is a perspective view of the directional pad of FIG. 1A in which four of the protrusions are in the deployed state and eight of the protrusions are in the retracted state.

To move protrusions 42 between the retracted and deployed states, directional pad 10 can include a plurality of actuators 62, such as greater than or equal to any one of, or between any two of, four, five, six, seven, eight, nine, ten, eleven, or twelve (e.g., greater than or equal to eight, such as twelve or one for each protrusion 42) actuators. Each of actuators 62 can be configured to move a respective one of protrusions 42 between the retracted and deployed states, thereby allowing independent movement of the protrusions such that the combination of protrusions in the deployed state and protrusions in the retracted state can be set based on the configuration of selectable regions (e.g., sectors 28) that is appropriate for control in the particular application. For example, as shown in FIG. 2C, for applications whose controllable actions require all (e.g., twelve) selectable sectors 28, actuators 62 for all protrusions 42 that underlie the sectors can be activated to move all protrusions to the deployed state. However, as shown in FIG. 2D, for applications whose controllable actions require less than all—such as only four, as shown—selectable sectors 28, actuators 62 for protrusions 42 that underlie the selectable sectors can be activated to move those protrusions to the deployed state without activation of the other actuators such that the remainder of the protrusions that underlie non-selectable sectors can remain in the retracted state.

Each of actuators 62 can comprise any suitable actuator to move a protrusion 42 between the retracted and deployed states, such as a pneumatic actuator, an electric actuator (e.g., an electromechanical or electrohydraulic actuator), a hydraulic actuator, and/or the like that can cause, for example, linear and/or rotary movement. As shown, each of actuators 62 comprises a linear actuator having a shaft 66 that is coupled to a respective one of protrusions 42; for example, the shaft can be coupled to (and can, but need not, be fixed to) a respective one of fingers 54 (e.g., to lower surface 58b thereof) that the protrusion is coupled to. Shaft 66 of each of actuators 62 can be linearly movable between a first state in which a protrusion 42 coupled to the shaft is in the retracted state (FIG. 2A) (e.g., by pulling a finger 54 coupled to the shaft to the first position, or by allowing the finger to return to the first position per the above-described biasing) and a second state in which the protrusion coupled to the shaft is in the deployed state (FIG. 2B) (e.g., by pushing the finger coupled to the shaft to the second position). Additionally, the portion of shaft 66 of each of actuators 62 that is coupled to a protrusion 42 (e.g., via finger 54) can be disposed outside of a planform of touch sensor 70 such that the shaft does not interfere with the touch sensor when moving. Linear actuator 62 can comprise a latching solenoid such that shaft 66 can move from the first state to the second state or vice versa when power is supplied to the actuator, but power is not needed to keep the shaft in the first or second states; this can provide a power-efficient mechanism for moving protrusions 42.

Directional pad 10 can have any suitable geometry to facilitate a user's interaction with the directional pad. For example, because an action to be controlled can depend on the angular position of the input into directional pad 10 (e.g., can depend on which of sectors 28 is selected), upper surface 26a of the directional pad can have a circular planform that is consonant with such angular-position-based control; however, in other embodiments, the directional pad's upper surface can have a planform of any suitable shape, such as a polygonal (e.g., hexagonal, octagonal, or the like) shape. Additionally, to fit on a handheld controller, directional pad 10 can be relatively compact. For example, a transverse dimension (e.g., diameter) of upper surface 26a of directional pad 10 can be less than or equal to any one of, or between any two of, 55, 50, 45, 40, or 35, 30, 25, or 20 mm (e.g., between 20 and 40 mm). Upper surface 26a of directional pad 10 can also be smooth, and optionally concave, to facilitate a user's ability to scroll across the upper surface to make different inputs (e.g., without lifting a finger); such a configuration may be particularly well-suited with the directional pad including a touch sensor 70 as described above, with deployed protrusions 42 providing tactile feedback to the user to guide the user's fingers to the regions (e.g., sectors 28) of the top's upper surface that are selectable. Additionally, openings 34 that receive protrusions 42 can each be disposed closer to periphery 30 of shell 14's top 18 than to a center of the top, which is where a user may naturally gravitate to when making inputs with directional pad 10, thereby promoting the protrusions' ability to readily indicate which regions of the top's upper surface are selectable.

Figure 3A:
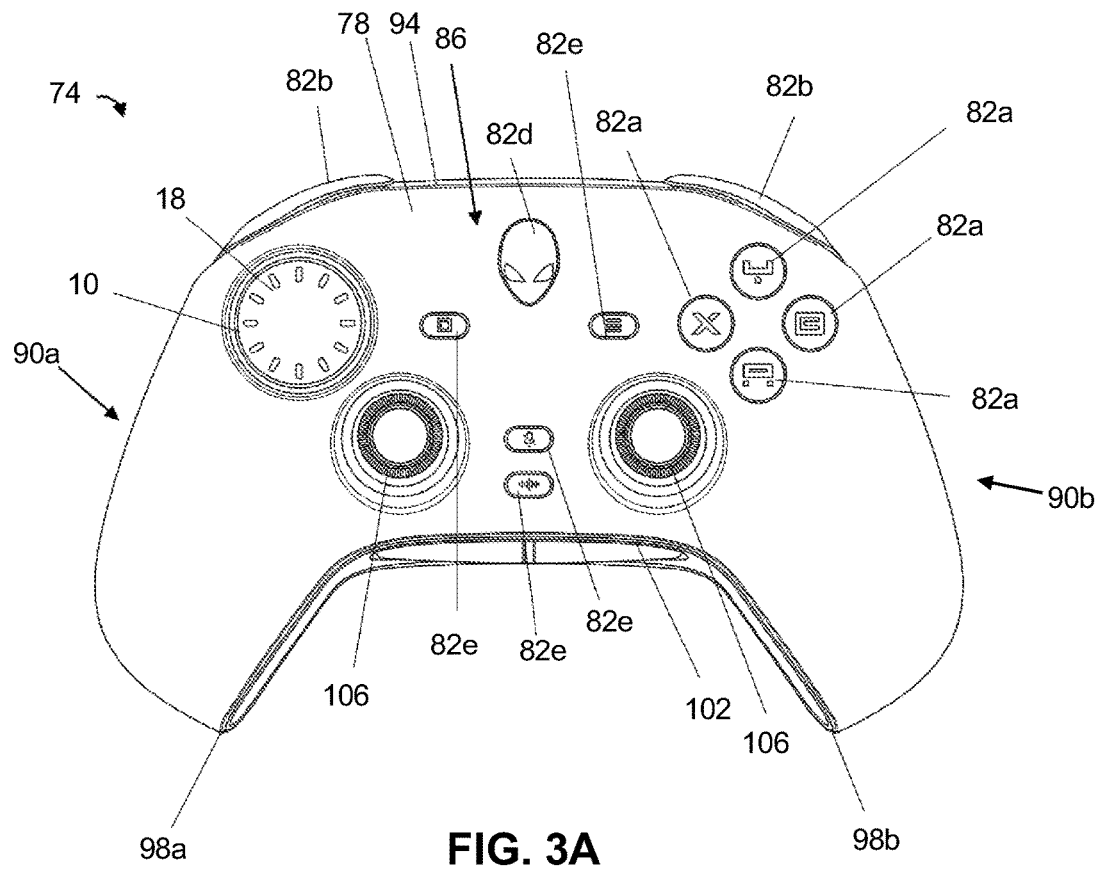
FIG. 3A is a top view of one of the present controllers that includes the directional pad of FIG. 1A.
Figure 3B:
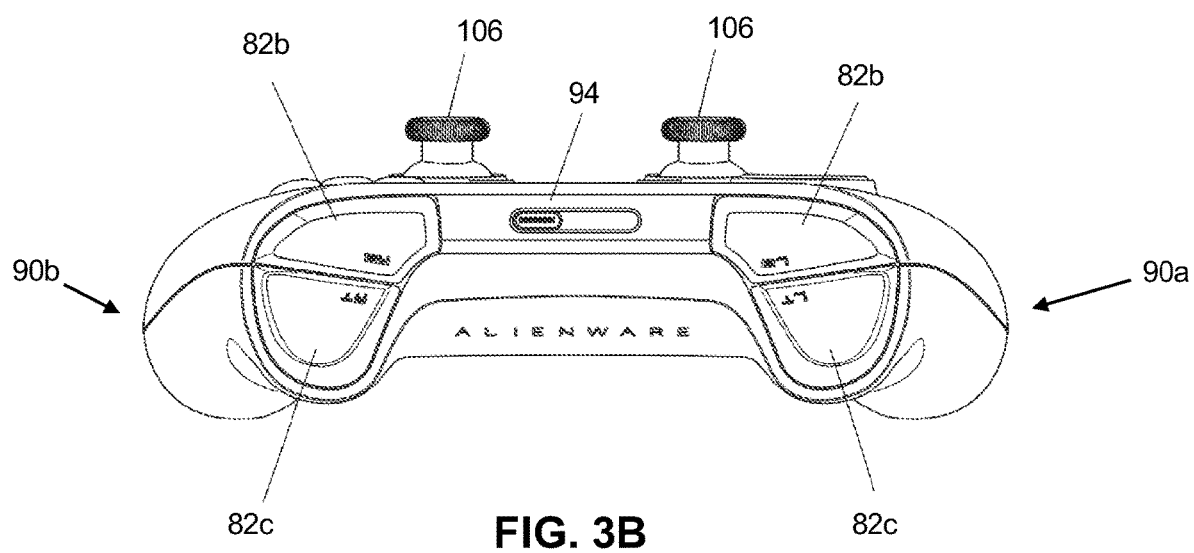
FIG. 3B is a front view of the controller of FIG. 3A.

Referring to FIGS. 3A and 3B, shown is a controller 74 that can comprise a body 78 and directional pad 10 (e.g., any of the directional pads described above) coupled to the body such that the directional pad's upper surface 26a faces upward to allow a user to interact with it. Controller 74 can also comprise a plurality of buttons 82a-82e coupled to the body, which can be used to make inputs other than those made using directional pad 10.

Controller 74 can have any suitable shape and any suitable configuration of buttons 82a-82c for control in a variety of applications, such as in software applications like gaming applications. As shown, controller 74 can be a handheld controller; the controller's body 78 can include a main portion 86 disposed between first and second gripping portions 90a and 90b, which can each project rearwardly away from the main portion to provide an area that allows a user to comfortably hold the controller. Directional pad 10 and buttons 82a-82e can be positioned such that a user has ready access to both the directional pad and the buttons to make inputs while holding controller 74. For example, directional pad 10 can be disposed closer to first gripping portion 90a than to second gripping portion 90b, while four buttons 82a (e.g., A-, B-, X-, and Y-buttons) can be disposed closer to the second gripping portion than to the first gripping portion. Additionally, directional pad 10 and buttons 82a can each be positioned in a front portion of controller 74's body 78 to facilitate access thereto, e.g., with the directional pad disposed closer to a front 94 of the body than to a rearmost point 98a of first gripping portion 90a (e.g., the point on the first gripping portion that is furthest from the body's front) and the four buttons each disposed closer to the front of the body than to a rearmost point 98b of second gripping portion 90b (e.g., the point on the second gripping portion that is furthest from the body's front).

Controller 74's buttons can also include two bumpers 82b, two triggers 82c, a power button 82d (e.g., to power the controller on and off), and a plurality of accessory buttons 82e (e.g., for menu selection, muting a microphone, initiating a voice command, and/or the like) to provide a user more control options. While directional pad 10 and buttons 82a, 82d, and 82e can be coupled to a top-facing surface of body 78 (e.g., with buttons 82d and 82e coupled to the body's main portion 86), bumpers 82b and triggers 82c can be coupled to a front-facing surface of the body's front 94 to allow controller 74's buttons to be packaged in a readily-holdable form factor that permits ready access to the buttons. As shown, for example, each of bumpers 82b and each of triggers 82c can be disposed closer to a respective one of first and second gripping portions 90a and 90b than to the other of the first and second gripping portions, with each bumper disposed over a respective one of the triggers.

Controller 74 can also include two thumbsticks 106, which can each be pivotably coupled to a top-facing surface of body 78 (e.g., such that the thumbstick can pivot about multiple axes) to allow a user to make, for example, directional inputs based on the pivoting angle and direction of the thumbstick. Thumbsticks 106 can be positioned such that a user can readily control them with the user's thumbs. For example, each of thumbsticks 106 can be coupled to body 74's main portion 86 and can be disposed closer to a rear 102 of the main portion of the body than to the body's front 94.

As shown, controller 74 can be a wireless controller (e.g., comprising a transceiver configured to transmit commands) to power the components of controller 74, the controller can include a battery. In other embodiments, however, controller 74 can be a wired controller (e.g., with a wire configured to be coupled to an information handling system such that commands can be transmitted to the information handling system over the wire and power can be supplied to the controller over the wire).

Figure 4A:
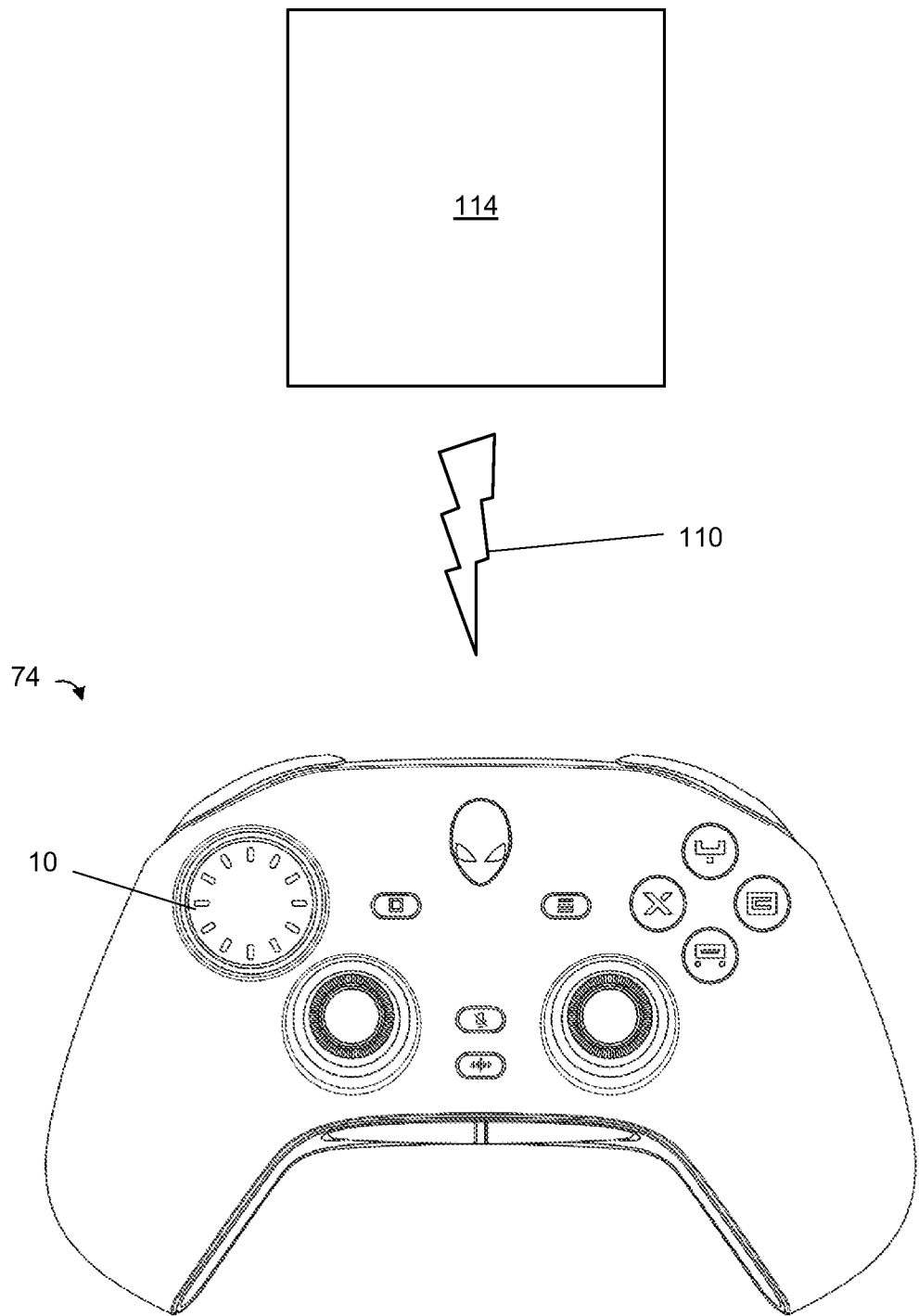
FIG. 4A illustrates a signal being sent to the controller of FIG. 3A in some of the present methods to indicate which regions of the controller's directional pad are usable for control in a particular application.
Figure 4B:
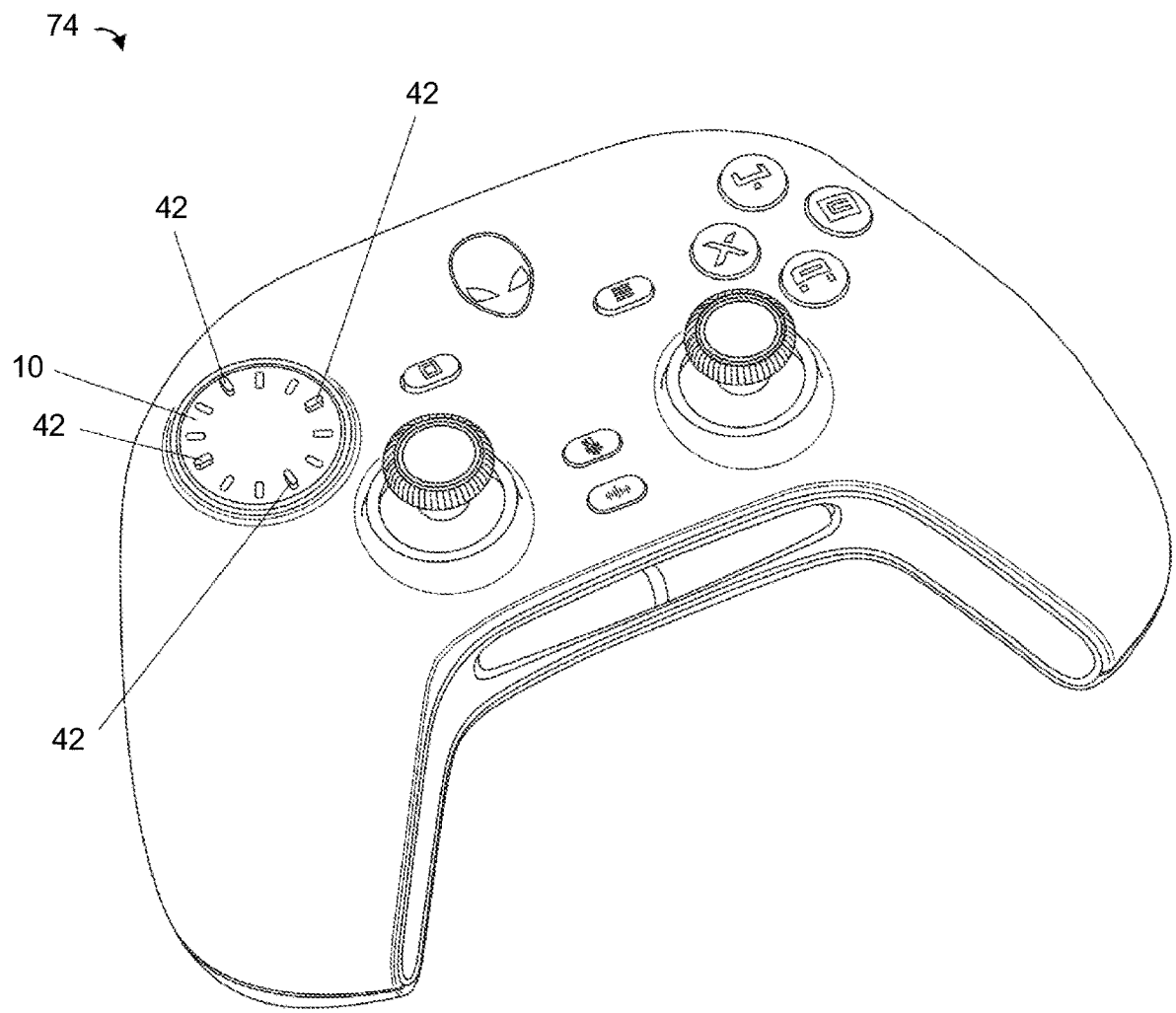
FIG. 4B illustrates protrusions being moved from the retracted state to the deployed state in some of the present methods in response to the signal.

Referring to FIGS. 4A and 4B, some of the present methods of using a controller (e.g., 74) that includes a directional pad (e.g., 10) (e.g., any of the controllers and directional pads described above) comprise sending a signal (e.g., 110) to the controller (FIG. 4A). The signal-sending device (e.g., 114) can be an information handling system comprising, for example, a computer (e.g., a personal computer, a video game console, or a computer onboard a vehicle or robot), a tablet, an entertainment device such as a television, and/or the like, and can be configured to receive commands from the controller to execute actions in a software application (e.g., a gaming application) or on a system (e.g., a vehicle or robot). If the controller is a wireless controller the signal can be an electromagnetic signal (e.g., a radiofrequency (RF) signal), and if the controller is a wired controller the signal can be an electric signal (e.g., conveyed by a wire connecting the controller to the signal-sending device like an information handling system).

The signal can include information regarding which regions (e.g., which sectors 28) of an upper surface (e.g., 26a) of a top (e.g., 18) of the directional pad's shell (e.g., 14) are used for control (e.g., to control actions in the software application or on the system). For example, if the actions to be controlled call for inputs in only four of the sectors of the directional pad, the signal can include information regarding the four sectors that are used for control; however, as explained above, different applications may involve different actions that call for the use of different sectors. As such, some methods comprise, in response to the signal, moving at least a first one of the protrusions (e.g., 42) from the retracted state to the deployed state (e.g., as described above) (FIG. 4B); in the example shown, four protrusions are moved to the deployed state. The deployed protrusion(s) can extend past the upper surface of the shell's top in the region(s) (e.g., sector(s)) of the upper surface that, per the signal, are used for control, thereby providing an indication to a user (e.g., via tactile feedback) that those region(s) are selectable for control. Because not all applications will employ all regions (e.g., sectors) of the top's upper surface for control, in some methods, when the first protrusion is moved to the deployed state, at least a second one of the protrusions is in the retracted state; in the example shown, eight of the protrusions are in the retracted state. Depending on the application, greater than or equal to any one of, or between any two of, one, two, three, four, five, six, seven, eight, nine, ten, eleven, or twelve (e.g., at least four) protrusions can be moved from the retracted state to the deployed state and less than or equal to any one of, or between any two of, eleven, ten, nine, eight, seven, six, five, four, three, two, or one (e.g., less than or equal to eight) protrusions can be in the retracted state when the other protrusions are deployed.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the products, systems, and methods are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A directional pad for a controller, the directional pad comprising:
    a shell that includes a top that has:
        opposing upper and lower surfaces; and
        a plurality of openings that each extend from the upper surface to the lower surface; and
    a plurality of protrusions, each movable between:
        a retracted state in which the protrusion is disposed at or below the upper surface of the top of the shell; and
        a deployed state in which the protrusion extends through a respective one of the openings of the top of the shell such that at least a portion of the protrusion is disposed above the upper surface of the top of the shell; and
    a plurality of actuators, each configured to move a respective one of the protrusions between the retracted and deployed states.

2. The directional pad of claim 1, comprising a haptic body that includes:
    the projections;

a central region that has opposing upper and lower surfaces, wherein the upper surface of the central region is coupled to the lower surface of the top of the shell; and a plurality of fingers that each extend outwardly from the central region and have opposing upper and lower surfaces, wherein:

the upper surface of each of the fingers faces the lower surface of the top of the shell;

each of the fingers is pivotable relative to the central region between first and second positions; and each of the protrusions of the haptic body projects upwardly from the upper surface of a respective one of the fingers such that the protrusion:

is in the retracted state when the finger is in the first position; and is in the deployed state when the finger is in the second position.

3. The directional pad of claim 2, wherein each of the actuators comprises a linear actuator having a shaft that:

is coupled to a respective one of the fingers of the haptic body; and is linearly movable between first and second states such that the finger coupled to the shaft:

is in the first position when the shaft is in the first state; and is in the second position when the shaft is in the second state.

4. The directional pad of claim 3, wherein the shaft is coupled to the lower surface of a respective one of the fingers of the haptic body.

5. The directional pad of claim 3, wherein the linear actuator comprises a latching solenoid.

6. The directional pad of claim 2, wherein each of the fingers is integral with the central region of the haptic body.

7. The directional pad of claim 2, comprising:

a capacitive touch sensor coupled to the haptic body such that the haptic body is disposed between the capacitive touch sensor and the top of the shell;

wherein the capacitive touch sensor is configured to measure a position at which an electrically-conductive object touches the upper surface of the top of the shell.

8. The directional pad of claim 1, wherein:

the openings comprise eight or more openings;

the protrusions comprise eight or more protrusions; and the actuators comprise eight or more actuators.

9. The directional pad of claim 8, wherein:

the upper surface of the top of the shell has a circular planform; and each of the openings is disposed closer to the periphery of the top than to a center of the top.

10. A controller comprising:

a body;

a plurality of buttons coupled to the body; and a directional pad that is coupled to the body and comprises:

a shell that includes a top that has:

opposing upper and lower surfaces; and a plurality of openings that each extend from the upper surface to the lower surface;

a plurality of protrusions, each movable between:

a retracted state in which the protrusion is disposed at or below the upper surface of the top of the shell; and a deployed state in which the protrusion extends through a respective one of the openings of the top of the shell such that at least a portion of the protrusion is disposed above the upper surface of the top of the shell; and a plurality of actuators, each configured to move a respective one of the protrusions between the retracted and deployed states.

11. The controller of claim 10, wherein:

the body has a main portion disposed between first and second gripping portions, each of the gripping portions projecting rearwardly away from the main portion;

the directional pad is disposed:

closer to the first gripping portion than to the second gripping portion; and closer to a front of the body than to a rearmost point of the first gripping portion; and the buttons include four buttons that are each disposed:

closer to the second gripping portion than to the first gripping portion; and closer to the front of the body than to a rearmost point of the second gripping portion.

12. The controller of claim 11, comprising two thumbsticks, each:

coupled to the main portion of the body; and disposed closer to a rear of the main portion of the body than to the front of the body.

13. The controller of claim 10, wherein the directional pad comprises a haptic body that includes:

the protrusions;

a central region that has opposing upper and lower surfaces, wherein the upper surface of the central region is coupled to the lower surface of the top of the shell; and a plurality of fingers that each extend outwardly from the central region and have opposing upper and lower surfaces, wherein:

the upper surface of each of the fingers faces the lower surface of the top of the shell;

each of the fingers is pivotable relative to the central region between first and second positions; and each of the protrusions of the haptic body projects upwardly from the upper surface of a respective one of the fingers such that the protrusion:

is in the retracted state when the finger is in the first position; and is in the deployed state when the finger is in the second position.

14. The controller of claim 13, wherein each of the actuators comprises a linear actuator having a shaft that:

is coupled to a respective one of the fingers of the haptic body; and is linearly movable between first and second states such that the finger coupled to the shaft:

is in the first position when the shaft is in the first state; and is in the second position when the shaft is in the second state.

15. The controller of claim 14, wherein the shaft is coupled to the lower surface of a respective one of the fingers of the haptic body.

16. The controller of claim 14, wherein the linear actuator comprises a latching solenoid.

17. The controller of claim 13, comprising:

a capacitive touch sensor coupled to the haptic body such that the haptic body is disposed between the capacitive touch sensor and the top of the shell;

wherein the capacitive touch sensor is configured to measure a position at which an electrically-conductive object touches the upper surface of the top of the shell.

18. The controller of claim 10, wherein:
the openings comprise eight or more openings;
the protrusions comprise eight or more protrusions; and
the actuators comprise eight or more actuators.

19. The controller of claim 18, wherein:
the upper surface of the top of the shell has a circular planform; and
each of the openings is disposed closer to the periphery of the top than to a center of the top.

20. A method comprising:
sending a signal to a controller that includes a directional pad coupled to a body of the controller, the directional pad comprising:
   a shell that includes a top that has:
      opposing upper and lower surfaces; and
      a plurality of openings that each extend from the upper surface to the lower surface; and
   a plurality of protrusions, each movable between:
      a retracted state in which the protrusion is disposed at or below the upper surface of the top of the shell; and
      a deployed state in which the protrusion extends through a respective one of the openings of the top of the shell such that at least a portion of the protrusion is disposed above the upper surface of the top of the shell; and
in response to the signal, moving at least a first one of the protrusions from the retracted state to the deployed state;
wherein when the first protrusion is moved to the deployed state, at least a second one of the protrusions is in the retracted state.

* * * * *